United States Patent [19]
Takemoto et al.

[11] Patent Number: 5,373,711
[45] Date of Patent: * Dec. 20, 1994

[54] APPARATUS FOR CLEANING THE DUST COLLECTOR/REMOVER FILTER

[75] Inventors: Sumio Takemoto; Kiyoshi Hayashi, both of Hyogo, Japan

[73] Assignee: Precision Fukuhara Works, Ltd., Hyogo, Japan

[*] Notice: The portion of the term of this patent subsequent to Jan. 12, 2010 has been disclaimed.

[21] Appl. No.: 48,267

[22] Filed: Apr. 14, 1993

[30] Foreign Application Priority Data

Apr. 16, 1992 [JP] Japan .................. 4-124270

[51] Int. Cl.⁵ .................. D04B 35/32; A47L 5/00
[52] U.S. Cl. .................. 66/168; 15/302; 15/345
[58] Field of Search .................. 66/168; 15/301, 345, 15/346; 139/300.1, 1 C; 242/131, 131.1; 55/294, 302

[56] References Cited

U.S. PATENT DOCUMENTS

| | | | |
|---|---|---|---|
| 2,984,263 | 5/1961 | Loepsinger | 15/345 X |
| 3,287,755 | 11/1966 | Pansini | 15/345 X |
| 3,459,010 | 8/1969 | Ferri | 66/168 |
| 3,741,157 | 6/1973 | Krause | 15/345 X |
| 4,300,261 | 11/1981 | Woodward et al. | 15/345 |
| 4,359,801 | 11/1982 | Tate | 15/346 |
| 4,691,536 | 9/1987 | Yorisue et al. | 66/168 |
| 4,784,349 | 11/1988 | Remnick et al. | 242/131 |
| 4,810,270 | 3/1989 | Terry et al. | 55/294 |
| 4,869,080 | 9/1989 | Rovinsky et al. | 66/168 |
| 4,921,511 | 5/1990 | Dreischmeier | 55/294 |
| 5,074,337 | 12/1991 | Shaw et al. | 139/1 C |
| 5,114,444 | 5/1992 | Stüble | 55/294 |
| 5,177,985 | 1/1993 | Igarashi et al. | 66/168 |

FOREIGN PATENT DOCUMENTS

| | | | |
|---|---|---|---|
| 0389045 | 9/1990 | European Pat. Off. | |
| 0509483A1 | 10/1992 | European Pat. Off. | |
| 0510508A3 | 10/1992 | European Pat. Off. | |
| 1017890 | 10/1957 | Germany | 55/294 |
| 3139608A1 | 10/1981 | Germany | |
| 0305818 | 3/1989 | Germany | |
| 3833434C1 | 12/1989 | Germany | |
| 2087543A | 5/1982 | United Kingdom | |
| 698638 | 11/1979 | U.S.S.R. | 55/294 |

*Primary Examiner*—Clifford D. Crowder
*Assistant Examiner*—John J. Calvert
*Attorney, Agent, or Firm*—Bell, Seltzer, Park & Gibson

[57] ABSTRACT

Fiber waste generated during operation of a circular machine is removed from components of the machine and/or an associated creel by air currents that conduct the fiber waste to one or more filters. Air suction and/or air jet forces remove the fiber waste from the filters. In one embodiment the waste removing apparatus includes stationary air suction and/or air jet devices that remove the fiber waste from a rotating filter. In another embodiment the air suction and air jet devices rotate and the filter is stationary.

8 Claims, 6 Drawing Sheets

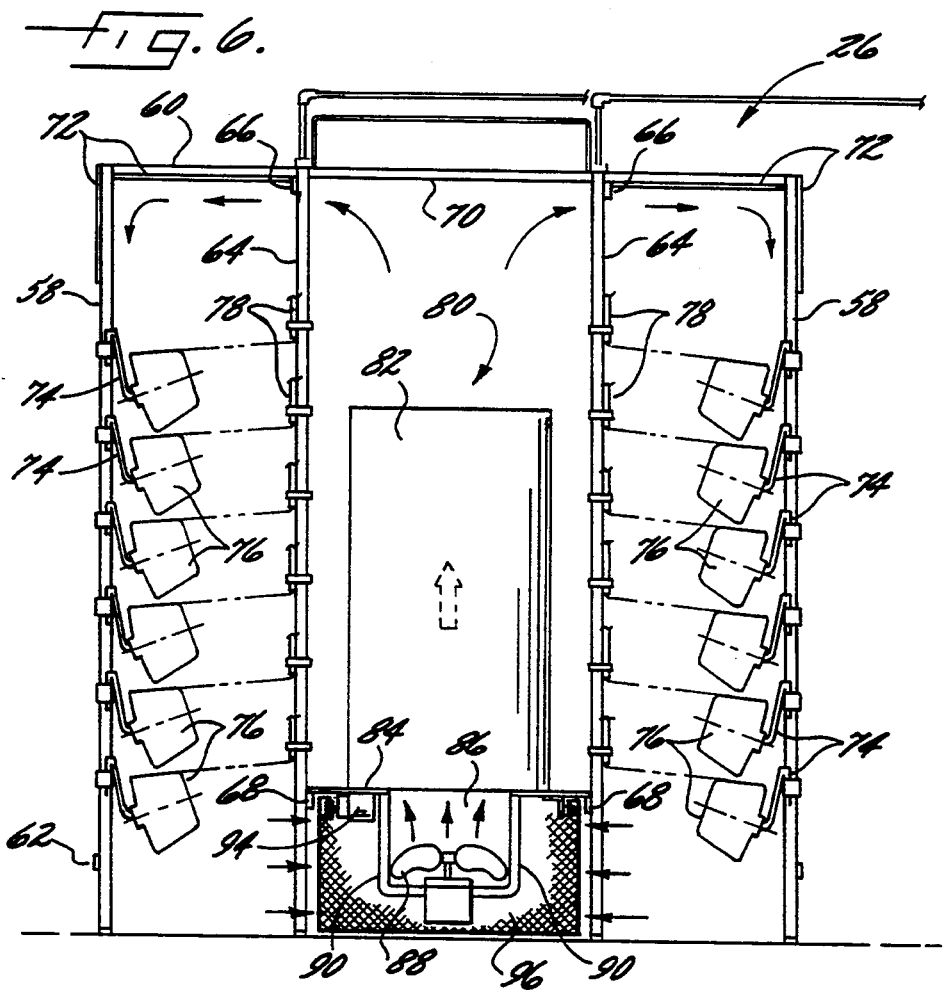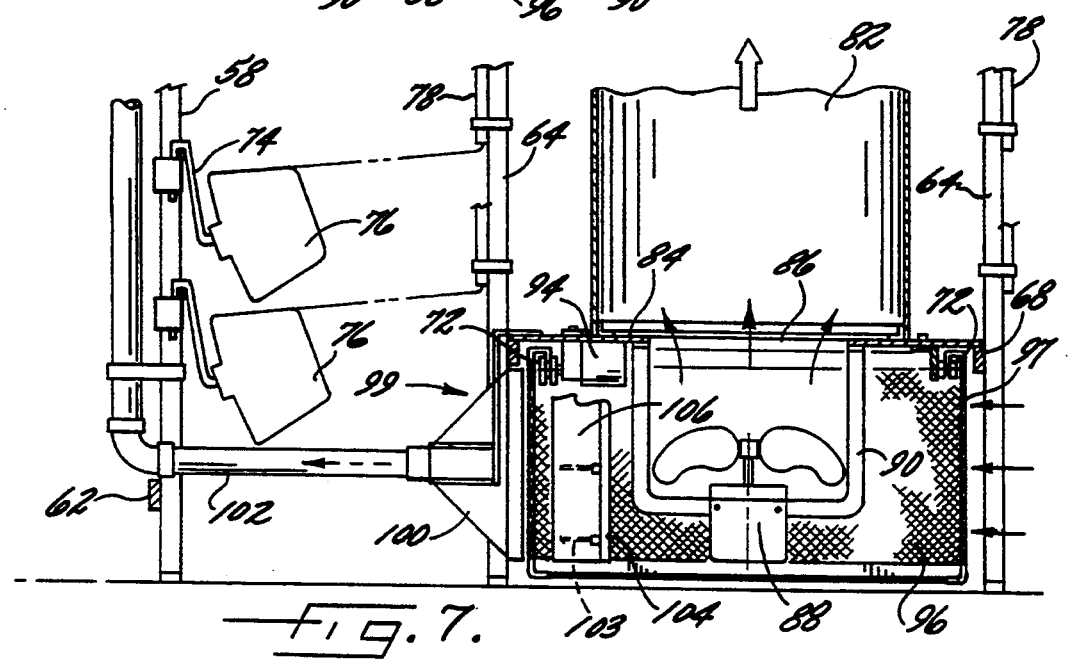

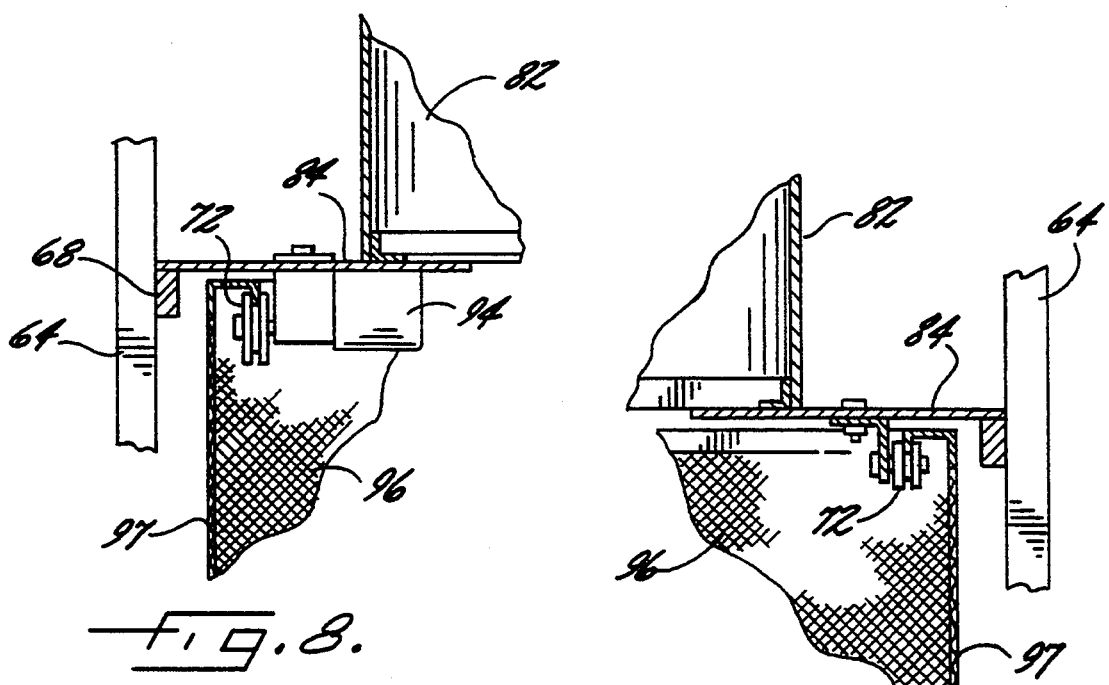
Fig. 8.
Fig. 9.
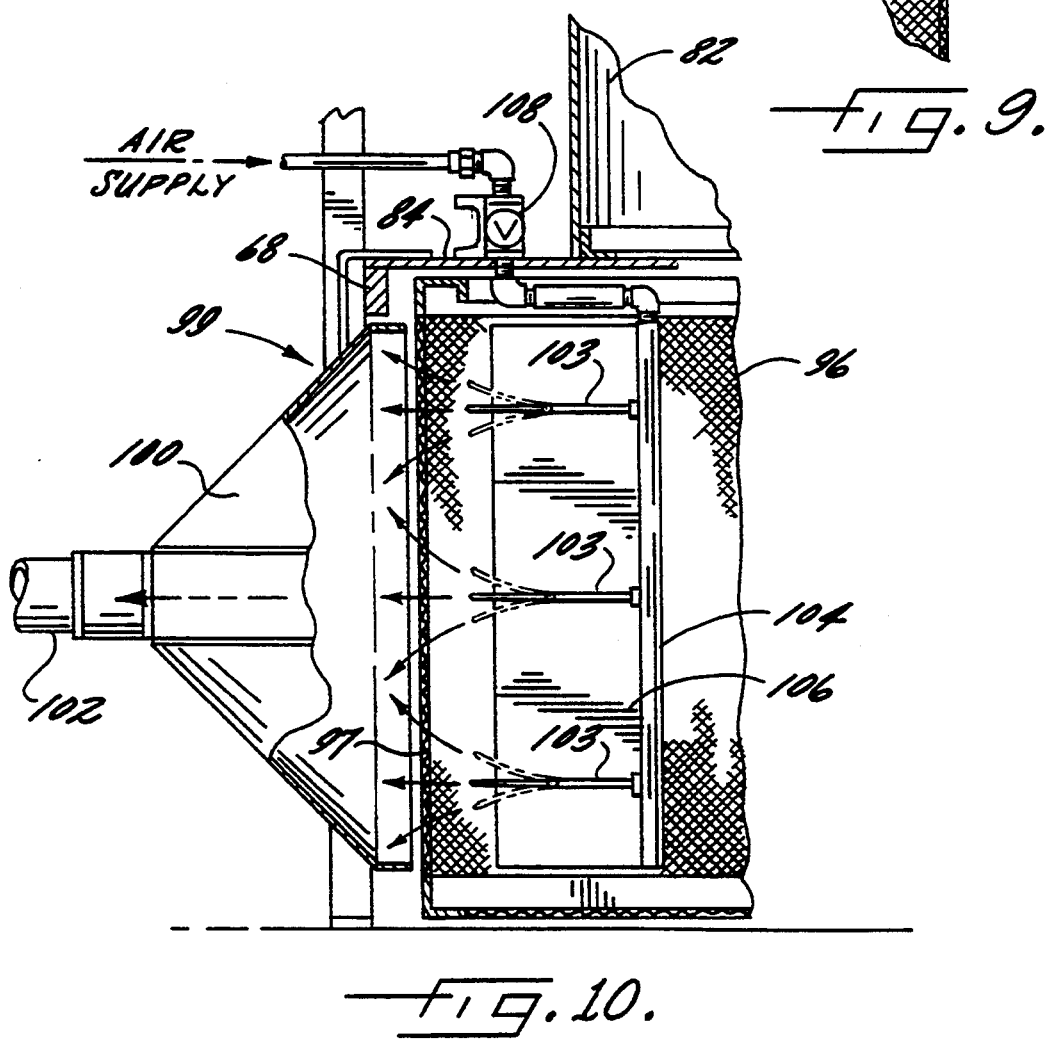
Fig. 10.

APPARATUS FOR CLEANING THE DUST COLLECTOR/REMOVER FILTER

FIELD OF THE INVENTION

This invention relates to an apparatus for collecting lint, dirt and similar matter, hereinafter referred to as "fiber waste," from components of a circular knitting machine and/or an adjacent creel stand. The invention more specifically relates to an apparatus for removing fiber waste from filters by subjecting the filters to both air blasts and to air suction.

BACKGROUND OF THE INVENTION

Over 100 yarn containing bobbins may be associated with a circular knitting machine. When cotton yarn is employed for forming the knitted fabric, the fiber waste generated by the yarn guides, yarn feeders and other components of the knitting machine and creel, and set adrift in the ambient air, is of a substantial amount. The amount of such fiber waste tends to steadily increase as the operating speeds of the knitting machines increase. Once the fiber waste has become airborne, it tends to settle upon the yarn feeders, yarn guides and the knitting mechanism of the knitting machine, and even upon adjoining machines. This causes yarn breakage, degradation of the knitted fabric, and other problems.

Various kinds of devices have heretofore been proposed for removing fiber waste generated from knitting machinery. The majority of the prior devices employ either a motor driven fan or an air blower to blow the fiber waste away. It has also been proposed to provide a cover about each knitting machine, and to install an exhaust duct near the machine so that the machine operator may gather the fiber waste and introduce it into the exhaust duct.

The assignee of the present invention has heretofore developed several systems for the collection and removal of fiber waste. For example, the fiber waste collector disclosed in Japanese Patent Application No. 3-119439, which is now pending, includes a filter means for attracting the fiber waste generated from the vicinity of the knitting section (yarn carrier, sinker, sinker cap and needle system) of a knitting machine, or from the yarn feeder, yarn guide, end breakage detectors and other devices mounted thereon. Similarly, the system disclosed in pending Japanese Patent Application No. 3-116850 includes filter means for attracting fiber waste from the creel stand and yarn bobbins associated with the knitting machine. Even when the circular knitting machine and/or creel stand are provided with suction means for removing fiber waste from the filters, the suction means in many instances is not capable of completely removing the fiber waste from the filters, particularly if such fiber waste contains grease or the like.

SUMMARY OF THE INVENTION

The present invention provides an improved filter cleaning apparatus for removing fiber waste from filters upon a knitting machine and/or creel. The filters are illustratively and preferably of annular shape. In a first embodiment thereof the improved filter cleaning apparatus includes drive means for rotating a filter, a suction nozzle disposed inwardly of the filter, and air jet means that is disposed externally of the filter and that subjects the filter to jets of air.

In a second embodiment, which is directed to an apparatus for collecting and removing fiber waste from a creel stand, a filter is rotatably mounted in the lower center part of the creel stand. An air suction/blowing means adjacent the filter creates an air flow that conducts fiber waste within the creel to the filter. Drive means rotates the filter. The filter is cleaned by filter cleaning means that includes a suction nozzle disposed externally of the filter, and air jet means that is disposed inwardly of the filter in juxtaposition with the suction nozzle, and that directs jets of air substantially perpendicularly against an air permeable wall of the filter.

A third embodiment of the invention includes an apparatus similar to the apparatus of the first embodiment. However, the air jet means of the filter cleaning means of the third embodiment directs jets of air substantially parallel to the permeable surface of the filter. Preferably the suction nozzle of the third embodiment is of cylindrical shape and has a slot-like suction inlet that extends longitudinally of the nozzle.

In a fourth embodiment of the invention, the apparatus for collecting and removing fiber waste from a filter of a circular knitting machine includes a suction nozzle in the radially inner part of the filter, drive means for rotating the suction nozzle, and air jet means disposed externally of the filter means and adapted to emit blasts of air against the filter means.

In each of the aforesaid embodiments of the invention except for the third embodiment, the blasts of air emitted by the air jet means preferably are substantially perpendicular to the filter surface upon which fiber waste is collected. Additionally, the blasts of air preferably are discharged from the air jet means via a nozzle made of flexible material so that the nozzle will undergo oscillating movement in response to the pressure of the air passing through the nozzle.

In an embodiment of the invention having suction/blowing means disposed above the knitting section of the knitting machine, fiber waste generated at the knitting section passes into a suction cylinder, and is conducted upwardly through the cylinder to a rotating filter. The fiber waste passing from the cylinder is deposited upon the inner surface of an air permeable waste collecting wall of the filter. The fiber waste is removed from the filter by air ejected from an air jet pipe, and by the suction forces of a suction nozzle that conducts the waste from the filter and into a collection means disposed externally of the knitting machine. The same results would also be achieved if the filter were stationary and the suction nozzle and air jet cylinder rotated with respect to the filter.

In an embodiment wherein fiber waste is removed from a creel stand associated with a knitting machine, actuation of a motor driven fan disposed centrally of the creel stand, and adjacent the lower end thereof, produces an air flow that passes upwardly through a duct to a top plate of the creel stand. The air flow then passes outwardly and downwardly so as to entrain fiber waste generated adjacent the creel's bobbins and yarn guide pipe eyelets. The entrained fiber waste is then conducted to a filter that encircles a motor driven fan, and the suction force of such fan causes the fiber waste to adhere to a first waste collecting surface of an air permeable wall of the filter. The fiber waste collected upon the aforesaid surface of the filter wall is removed from it, while the filter rotates, by suction forces of a suction nozzle adjacent the waste-collecting surface of the filter wall, and also by air jet means that directs jets of air against the opposite side of the air permeable wall of the filter. The fiber waste thus removed from the filter is conducted to a fiber waste collection means located outside of the creel.

DESCRIPTION OF THE DRAWINGS

Other features of the invention will be apparent from the following description of illustrative embodiments thereof, which should be read in conjunction with the accompanying drawings in which:

FIG. 6 is a partially schematic elevational view of another embodiment wherein a creel stand is equipped with fiber waste collection means in accordance with the invention;

FIG. 7 is an enlarged fragmentary view of duct filter, filter cleaning, and creel components shown in the lower part of FIG. 6;

FIG. 8 is an enlarged fragmentary view, partially in vertical section and partially in elevation, of filter and filter support and driving components shown in FIGS. 6 and 7;

FIG. 9 is an enlarged fragmentary view, partially in section and partially in elevation, also showing filter and filter support components shown in FIGS. 6 and 7;

FIG. 10 is a view partially in vertical section and partially in elevation, of another embodiment wherein fiber waste upon a non-rotatable filter adjacent the bottom of the creel stand is removed from the filter by air jet means within the filter, and by air suction means outside of the filter;

DESCRIPTION OF THE PREFERRED EMBODIMENTS

Figure 1:
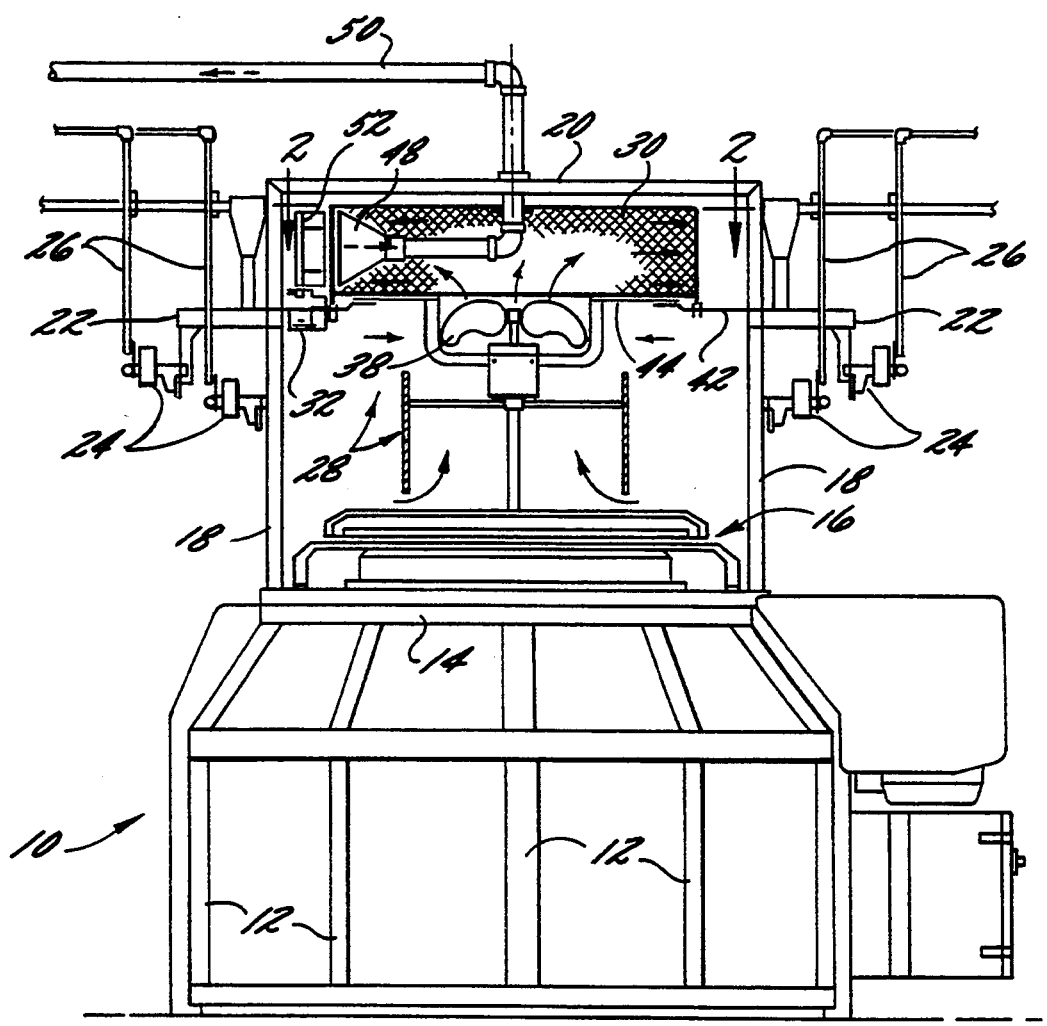
FIG. 1 is a front elevational view of a circular knitting machine having fiber waste collecting means and filter cleaning means in accordance with a first embodiment of the invention.

The circular knitting machine 10 shown in FIG. 1 has a plurality of legs 12 supporting a bed 14 that in turn supports a conventional knitting section 16 which includes known needle cylinder means, yarn carrier means and sinker means. Posts 18 extending upwardly from bed 14 support, at their upper ends, an annular member 20. Support members 22 extending outwardly from posts 18, support yarn feeding members 24 that are supplied with yarn conducted thereto through yarn guide pipes 26.

Machine 10 has, at a location above knitting section 16, apparatus 28 for collecting and removing fiber waste generated during operation of machine 10. Apparatus 28 includes an annular filter 30 having a lower edge that is supported by grooved rollers 34 for rotative movement about the filter's central axis. Rotative movement is imparted to filter 30 by a drive motor 32 that drives at least one of the rollers 34 when the motor is energized. Apparatus 28 further includes a motor driven fan 38 and a duct 40 that are supported in underlying relationship to filter 20 by support members 42. Members 42 project inwardly from upstanding posts 18 and supportively underlie support elements 44 that project radially outwardly from the upper ends of the arms 46 that extend outwardly and upwardly from the motor of fan 38. Fiber waste collecting/removing apparatus 28 further includes a stationary suction nozzle 48 that is located within the interior of filter 30 adjacent the inner, waste collecting surface of its air permeable wall 31. Nozzle 48 is connected to a suction source (not shown) by piping 50 that extends through openings in the upper framework of machine 10 and in the upper wall of filter 30. Fiber waste collecting apparatus 28 further includes a generally vertically extending air jet pipe 52 that is connected to an air supply source (not shown) and that extends in confronting adjacent relationship to the outer surface of filter wall 31. Elongate nozzles 54, which preferably and illustratively are of a flexible type, project from pipe 52 toward the outer face of filter 30. Air passing from pipe 50 into nozzles 54 impinges against and passes through the annular permeable outer wall 31 of filter 30 and into suction nozzle 48. Fiber waste upon the inner surface of filter wall 31 is conveyed by such air flow, as well as by the suction air flow within pipe 50, into pipe 50 and thence to a waste collection means outside of the knitting machine.

Figure 2:
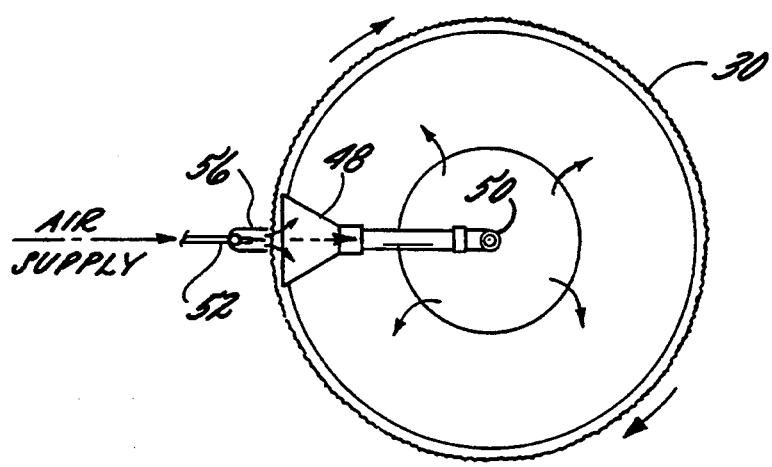
FIG. 2 is an enlarged partially schematic top plan view, taken in the direction of the arrows 2—2 of FIG. 1, of filter and filter cleaning components shown in FIG. 1.
Figure 3:
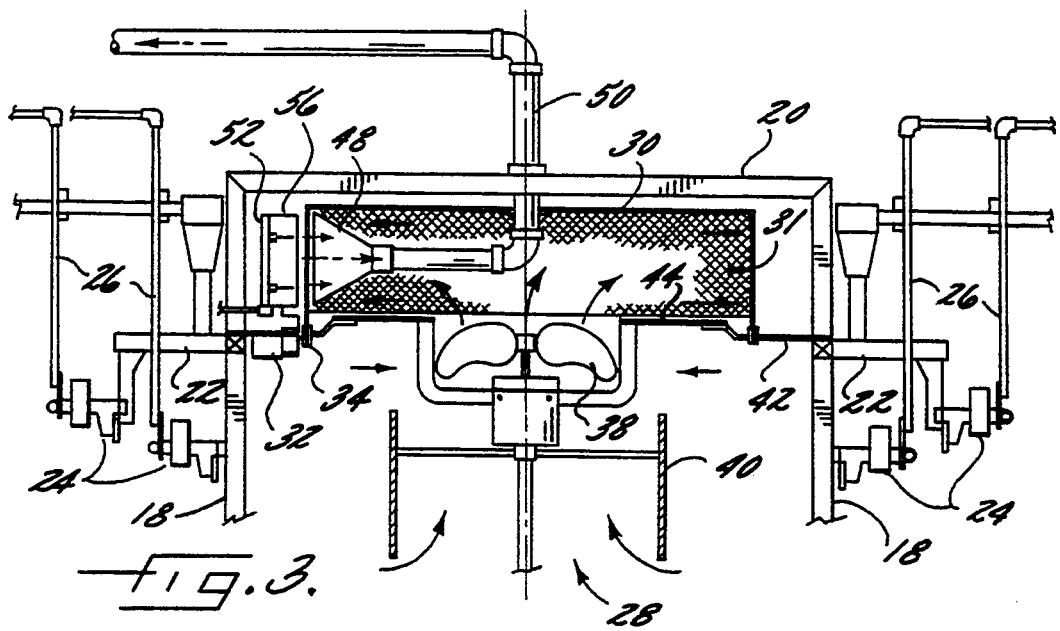
FIG. 3 is an enlarged view of filter, filter cleaning means, duct means, and knitting machine components shown in FIG. 1.
Figure 4:
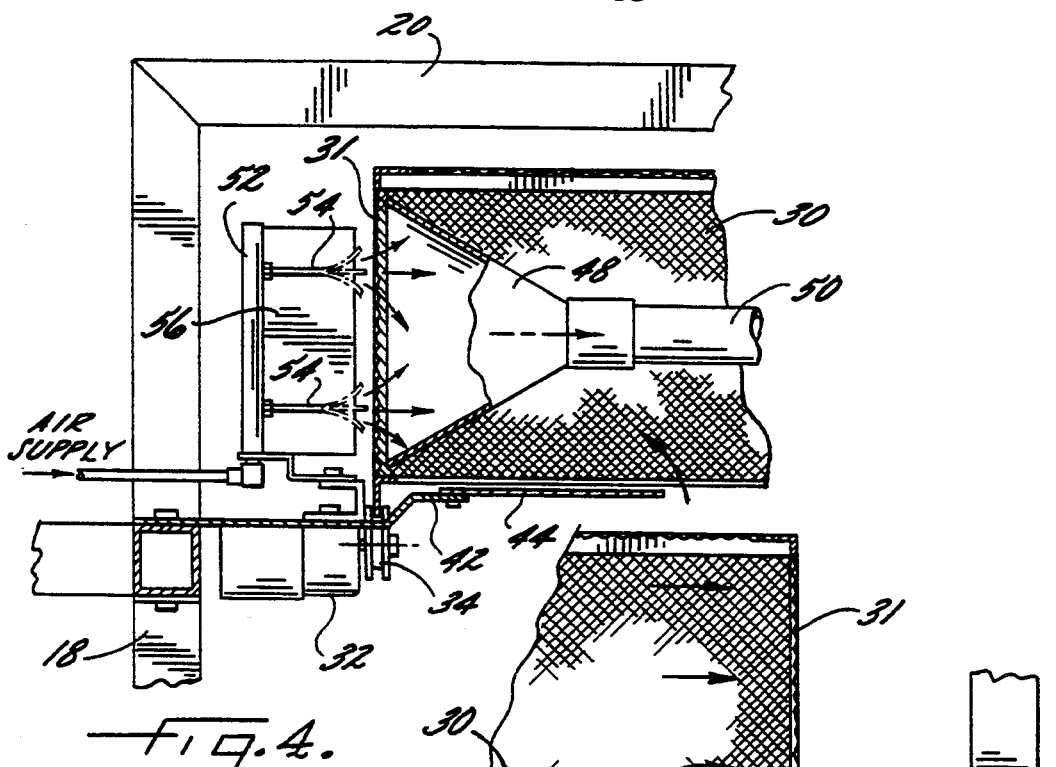
FIG. 4 is a fragmentary enlarged view of air jet means and air suction means associated with the filter, and of drive means for imparting rotative movement to the filter.
Figure 5:
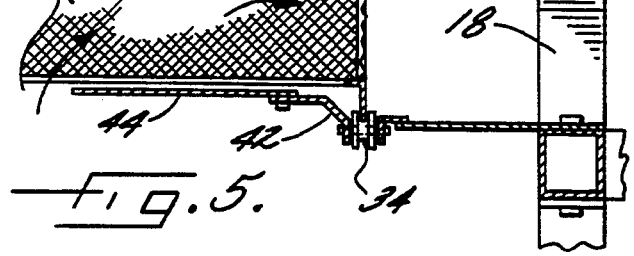
FIG. 5 is an enlarged fragmentary view of roller and support members that support the filter for rotative movement about its central axis.

As is indicated by phantom lines in FIG. 4, passage of air through nozzles 54 causes the outer ends of the nozzles to oscillate in a manner which increases the area upon the outer filter wall which is engaged by the air passing from the nozzles. As is shown in FIG. 2, a generally U-shaped retainer member 56 may also be provided upon pipe 52 for the purpose of preventing excessive movement of suction nozzles 48.

Energization of fan 38 causes air and therein entrained fiber waste to be drawn into duct 40, and to then pass upwardly through and from the upper end of duct 40, and thence into the interior of filter 30.

More efficient use of the air conducted to pipe 52 from an air supply source may be achieved, if desired, by providing a timer-controlled solenoid valve (not shown) in the air supply pipe. The valve would permit air to enter pipe 52 only at timed intervals, rather than continuously. Similarly, the drive motor 32 that rotates filter 30 may be energized only at predetermined intervals, rather than continuously, by a timer or the like (not shown).

FIGS. 6–10 of the drawings show another embodiment wherein filter cleaning apparatus in accordance with the invention is associated with a creel 26 used for supplying yarn to a knitting machine. Creel 26 includes a plurality of upstanding outer posts 58 that are spaced at equal intervals about the circumference of the creel and that are interconnected at their upper and lower ends by peripheral rings 60, 62, respectively. The creel further includes inner posts 64 that are spaced from each other at equal circumferential intervals about the central axis of the creel, and that are interconnected with each other by upper and lower inner rings 66, 68, respectively. The creel also includes a plurality of horizontal members 70 that extend between the posts 58, 64. A cover member 72, which may be an acrylic resin plate, extends over the upper surface of the creel and along the upper part of the sides of the creel. Each of the outer posts 58 have, at vertically spaced intervals along their length, a plurality of bobbin holders 74 that support yarn bobbins 76. Each inner post 64 is channel shaped and receives a plurality of yarn guide pipes 78. Each pipe 78 has an eyelet (not shown) made of ceramic or similar material within its yarn inlet end, and each pipe conducts yarn from a bobbin 76 to yarn feeding devices of a knitting machine such as that shown in FIG. 1 of the drawings.

The central part of creel 26 contains apparatus 80 for collecting fiber waste and removing it from the creel. Apparatus 80 includes a duct 82, illustratively of cylindrical shape, that is mounted at its lower end upon a base 84 that is connected to the inner creel posts 64, and that has a central opening 86. A motor driven fan 88 is mounted beneath the opening 86 by arms 90 that are connected at their upper ends to base 84. A circular array of grooved rollers 92, at least one of which is driven by a drive motor 94, is attached to the undersurface of base 84. An annular filter 96 has at its upper end flanges 98 that are received within the grooves of rollers 92 and that support the filter for low speed rotative movement about its central axis, which movement is imparted to the filter by motor 94 at desired times dictated by a preset timer (not shown). Filter 96 has an upstanding permeable side wall containing a multiplicity (preferably approximately 20–40 per square inch) of apertures. The top of the filter has a central opening that underlies and communicates with duct 82. The bottom of filter 96 is preferably of non-permeable construction.

Operation of fan 88 produces air currents that pass upwardly into and through duct 82, and from its upper end. The air currents then pass outwardly to and then downwardly through the outer areas of creel 26 containing the bobbins and yarn guides, and then pass to filter 96. Fiber waste entrained within the aforesaid air currents is deposited upon and adheres to the outer surface of the air permeable wall 97 of filter 96.

Apparatus 99 for removing the fiber waste from the outer surface of filter wall 97 includes a stationary suction nozzle 100 that is connected by a pipe 102 to a suitable suction source and associated fiber waste collector (not shown). The inlet opening of nozzle 100 is located in closely spaced relationship to the outer surface of the annular outer wall 97 of filter 96, and sucks fiber waste from the outer surface of the filter. To further assist removal of fiber waste from the filter, an air jet pipe 104 is mounted within filter 96 adjacent the inner surface of wall 97 and in confronting relationship to nozzle 100. Air ejected from pipe 104 passes through the outer wall of the filter and assists in conducting fiber waste thereon into nozzle 100. Air jet pipe 104 has at least one, and illustratively several, flexible nozzle members 103 that undergo flexible oscillating movement when air passes through them. A generally U-shaped plate 106, which preferably is also associated with pipe 104, prevents excessive movement of nozzles 103. To reduce the amount of compressed air utilized during operation of the filter cleaning apparatus, a control valve 108, which may be operated either manually or by means of a timer or the like, may be provided in the line through which compressed air is conducted to pipe 104.

Figure 11:
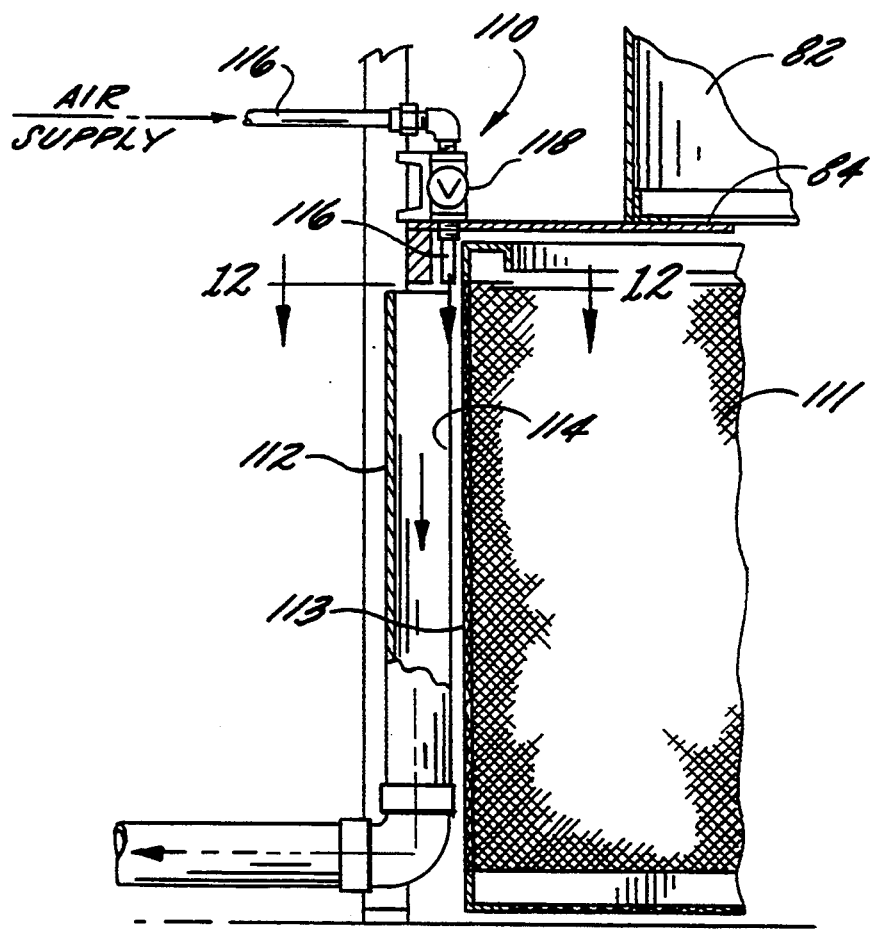
FIG. 11 is an enlarged fragmentary view of another embodiment of filter and filter cleaning components.
Figure 12:
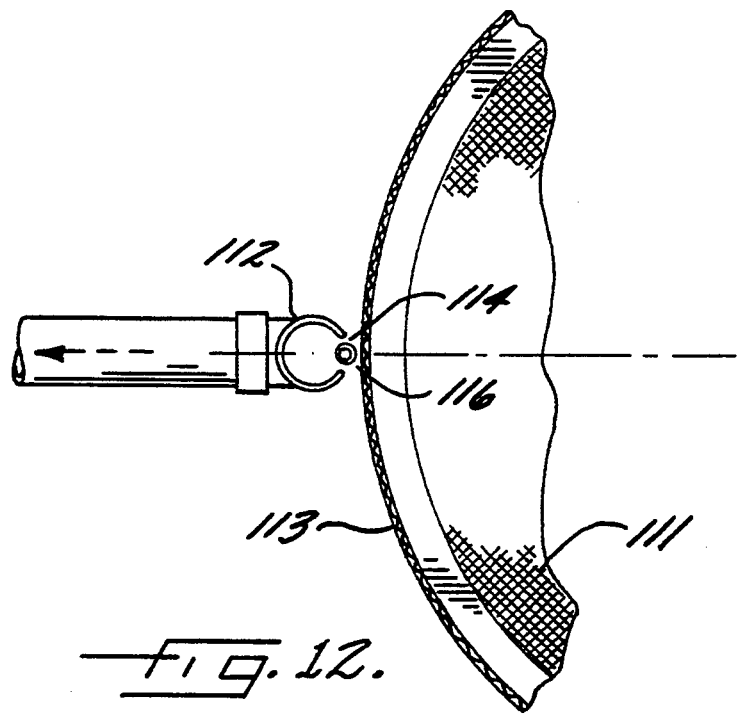
FIG. 12 is an enlarged fragmentary view, primarily in top plan and partially in section, taken in the direction of the arrows 12—12 of FIG. 11.

FIGS. 11 and 12 show another embodiment wherein an apparatus 110 for removing fiber waste from a rotating filter 111 includes a pipe 112 that is connected to a suction source (not shown), and that extends in closely spaced and generally parallel relationship to the air permeable outer wall 113 of a filter 111. Pipe 112 has a slot-like inlet opening 114 that extends longitudinally thereof, and that is in confronting adjacent relationship to the outer surface of the annular air permeable wall 113 of filter 111. The filter cleaning apparatus also includes an air supply pipe 116 containing a valve 118. When valve 118 is open, pipe 116 emits a jet of air which passes downwardly in closely adjacent and generally parallel relationship to the outer wall 113 of filter 111, and also in closely adjacent relationship to the slot 114 of pipe 112. The aforesaid air jet drives and sucks fiber waste from the outer surface of filter 111, and conducts the dislodged fiber waste into suction pipe 112 via slot 114. The fiber waste entering pipe 112 passes through it to a suitable fiber waste collection source (not shown). By way of example, the diameter of pipe 112 may be within the range of approximately 40 mm–50 mm, and slot 114 may have a length of approximately 230 mm and a width within the range of approximately 25 mm–30 mm. Any suitable means, such as that shown in the embodiment of FIGS. 7–9, may be used to impart rotation to filter 111.

Figure 13:
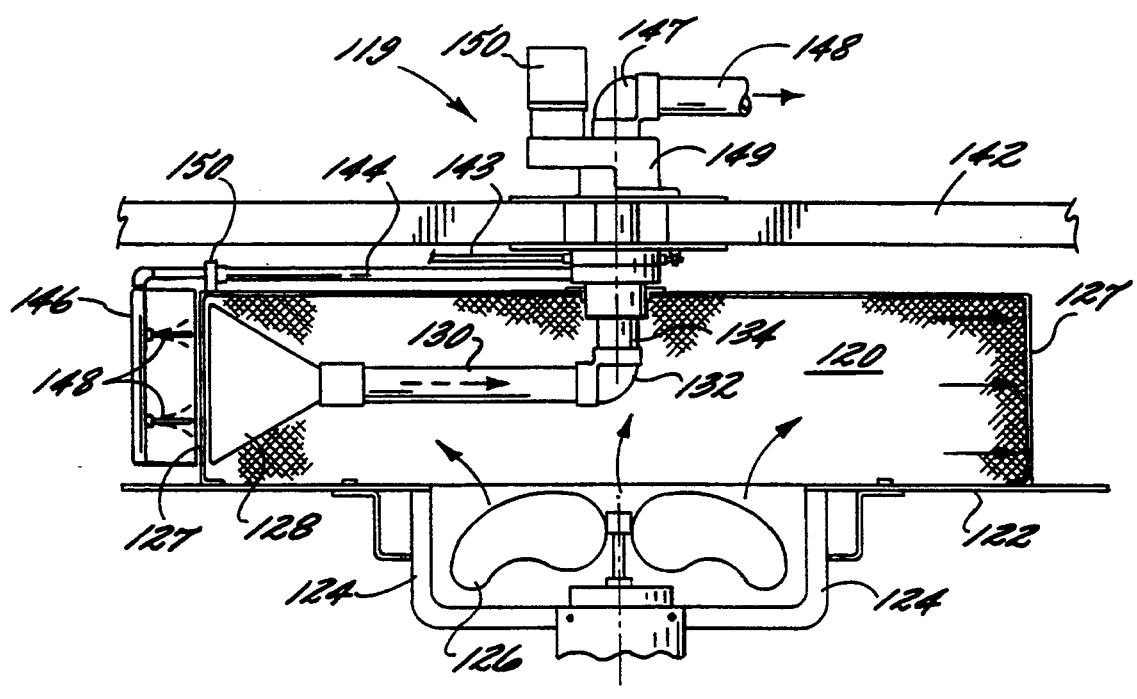
FIG. 13 is a view primarily in elevation of another embodiment of means for removing fiber waste from a filter located above the knitting section of the knitting machine.
Figure 14:
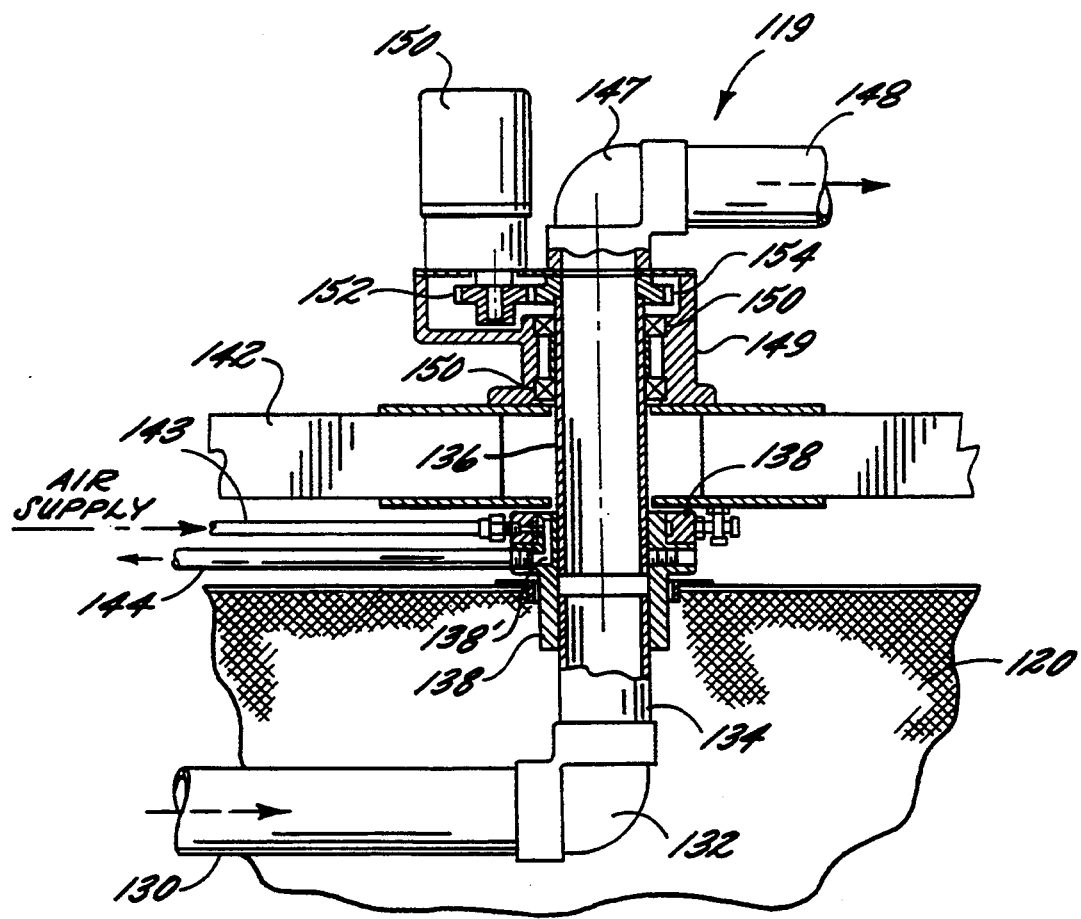
FIG. 14 is an enlarged fragmentary view, partially in elevation and partially in vertical section, of components of the fiber waste removing means of FIG. 13.

FIGS. 13 and 14 of the drawings show another embodiment of an apparatus 119 for removing fiber waste from a filter 120 adjacent the upper part of a circular knitting machine of the type shown in FIG. 1. In contrast to the filter 30 of FIG. 1, the filter 120 of FIGS. 13 and 14 does not rotate, and is fixedly mounted upon an annular support plate 122 that is connected to arms 124 that extend laterally and upwardly from a motor driven fan 126 that performs the same function as the fan 38 of FIG. 1. The apparatus 119 for removing fiber waste from the inner waste collecting surface of the annular air permeable outer wall 127 of annular filter 120 includes a suction nozzle 128 that is mounted for rotation within the filter and has an inlet opening in confronting adjacent relationship to the inner surface of filter wall 127. Mounting means mounting nozzle 128 for such movement includes a first, horizontally extending pipe 130 connected adjacent one end to nozzle 128. The opposite end of pipe 130 is joined via an elbow 132 to lower and upper pipes 134, 136 that are vertically aligned with each other and with the central axis of filter 120, and that are interconnected by a joint 138 for unitary rotative movement about such axis. A second joint 139 encircling and having a slip type connection with the upper part of joint 138 has internal air passageway means 138' that communicates with an air supply source (not shown) via a stationary pipe 143. A pipe 144 connected to joint 138 conducts air from joint 138. Pipe 144 extends radially outwardly, in adjacent overlying relationship to the upper surface of filter 120, to an air jet pipe 146 located in adjacent confronting relationship to the outer surface of filter wall 127. Pipe 146 illustratively has flexible oscillating nozzles 148 that extend toward wall filter 127. The upper end portion of pipe 136 extends into a fixture 149 upon the upper surface of support member 142. Fixture 149 contains bearings 150 that encircle the upper part of pipe 136 and support pipes 136, 134, 130 and elbow 132 for simultaneous rotative movement about the central axis of filter 120. Such movement is imparted to the aforesaid pipes and elbow by drive means that includes a drive motor 150 mounted upon fixture 149 and having an output gear 152 that meshes with a gear 154 encircling and secured to pipe 136. The elbow 147 and pipe 148 communicating with the upper end of pipe 136 do not undergo rotative movement since elbow 147 has a slip connection with pipe 136.

The inner end of pipe 144 is secured to and receives air from the joint 138 that is fixedly secured to pipes 136, 138. Pipe 144 therefore rotates in unison with pipe 130 and maintains air jet pipe 146 in confronting relationship to the inlet opening of nozzle 128, so that the air ejected from nozzles 148 assists in conducting fiber waste upon filter wall 127 into suction nozzle 130. A support member 150 may be provided upon pipe 144 to facilitate its rotative movement upon filter 120.

While specific embodiments of the invention have been shown and described, this was for purposes of illustration only, and not for purposes of limitation, the scope of the invention being in accordance with the following claims.

We claim:

1. Apparatus for collecting and removing fiber waste from a circular knitting machine having a knitting section, comprising:
   a fiber waste collecting filter mounted for rotative movement above and about a central axis of said knitting section, said filter including an air permeable wall having a first surface upon which fiber waste collects, and a second surface opposite said first surface;
   air suction/blowing means for conducting fiber waste from a knitting section of a circular knitting machine to said filter;
   drive means attached to said filter for rotating said filter; and
   filter cleaning means for cleaning fiber waste from said first surface of said filter wall, said cleaning means including a suction nozzle located within said filter and in confronting adjacent relationship to said first surface.

2. Apparatus for collecting and removing fiber waste from a creel associated with a knitting machine and having a vertical central axis, comprising:
   a filter mounted in a creel of a knitting machine for rotative movement about said axis, said filter including an air permeable wall having a first surface upon which fiber waste collects, and a second, opposite surface;
   drive means attached to said filter for rotating said filter;
   air suction/blowing means within said creel for conducting air borne fiber waste within said creel to said first surface of said wall of said filter;
   said apparatus including air suction means adjacent said first surface of said wall of said filter for sucking fiber waste from said filter, and air jet means adjacent said second surface of said wall for directing jets of air toward said second surface of said wall of said filter.

3. Apparatus as in any of claims 1 or 2 wherein said air jet means emits jets of air generally perpendicularly to said wall of said filter.

4. Apparatus as in claim 3 wherein said air jet means further includes at least one flexible nozzle through which said jets of air pass and said nozzle undergoes oscillating movement in response to passage of air therethrough.

5. Apparatus as in any of claims 1 or 2, wherein said air jet means emits jets of air generally parallel to said wall of said filter.

6. Apparatus as in claim 1, wherein said air suction means includes a pipe having a slot extending longitudinally thereof and confronting said wall of said filter.

7. Apparatus as in claim 6, wherein said air jet means is aligned with slot of said pipe, and directs said jets of air longitudinally of said slot.

8. Apparatus as in claim 1, wherein said filter is of annular shape.

* * * * *